(12) United States Patent
Zhang et al.

(10) Patent No.: US 12,245,271 B2
(45) Date of Patent: Mar. 4, 2025

(54) RANDOM ACCESS PREAMBLE FOR NON-TERRESTRIAL NETWORK

(71) Applicant: ZTE CORPORATION, Guangdong (CN)

(72) Inventors: Chenchen Zhang, Shenzhen (CN); Nan Zhang, Shenzhen (CN); Wei Cao, Shenzhen (CN); Kaibo Tian, Shenzhen (CN); Zhen Yang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 298 days.

(21) Appl. No.: 17/708,363

(22) Filed: Mar. 30, 2022

(65) Prior Publication Data

US 2023/0012036 A1    Jan. 12, 2023

Related U.S. Application Data

(63) Continuation of application No. PCT/CN2019/109610, filed on Sep. 30, 2019.

(51) Int. Cl.
*H04W 74/00* (2009.01)
*H04W 74/0833* (2024.01)

(52) U.S. Cl.
CPC ..... *H04W 74/004* (2013.01); *H04W 74/0833* (2013.01)

(58) Field of Classification Search
CPC ..... H04W 74/00; H04W 74/08; H04W 56/00; H04W 52/02; H04W 52/14; H04W 52/36; H04W 52/50; H04W 84/06; H04W 28/10; H04J 13/00; H04J 13/10; H04J 13/12; H04B 7/18; H04B 7/19; H04B 7/26; H04B 7/21; H04L 12/56; H04L 12/41; H04L 27/26
USPC .......................................................... 370/329
See application file for complete search history.

(56) References Cited

U.S. PATENT DOCUMENTS

| | | | | |
|---|---|---|---|---|
| 7,324,465 | B2 * | 1/2008 | Lim | H04B 7/18558 370/347 |
| 9,736,863 | B2 * | 8/2017 | Yang | H04L 27/261 |
| 9,814,076 | B2 * | 11/2017 | Kim | H04W 74/0891 |
| 10,111,252 | B2 * | 10/2018 | Eriksson | H04J 13/0062 |
| 10,594,536 | B2 * | 3/2020 | Yoon | H04W 74/08 |
| 10,631,341 | B2 * | 4/2020 | Kim | H04J 13/0062 |
| 10,893,543 | B2 * | 1/2021 | Li | H04L 27/2605 |

(Continued)

FOREIGN PATENT DOCUMENTS

| | | |
|---|---|---|
| CN | 109076602 A | 12/2018 |
| CN | 110226358 A | 9/2019 |

(Continued)

OTHER PUBLICATIONS

CATT, "Further details on NR 4-step RA Procedure" 3GPP TSG RAN WG1 Meeting #89, R1-1707464, May 19, 2017, Hangzhou, P.R. China (7 pages).
International Search Report and Written Opinion for PCT Appl. No. PCT/CN2019/109610, dated Jun. 30, 2020.
TCL, "PRACH design Resolving Time Ambiguity and Increasing Capacity" 3GPP TSG RAN WG1 Meeting #89, R1-1708218, May 19, 2017, Hangzhou, China (8 pages).

(Continued)

*Primary Examiner* — Man U Phan
(74) *Attorney, Agent, or Firm* — Foley & Lardner LLP

(57) ABSTRACT

The present disclosure relates to methods, systems and devices for use in a wireless terminal includes transmitting, to a wireless network node, a preamble comprising a plurality of parts, wherein each of the plurality of parts comprises at least one sub-preamble and the sub-preambles in the plurality of parts are generated based on a plurality of roots.

13 Claims, 14 Drawing Sheets

Transmit a plurality of preambles, wherein each of the plurality of preambles comprises at least one part, each of the at least one part comprises at least one sub-preamble and the sub-preambles of the plurality of preambles are generated based on a plurality of roots.

2600

(56) References Cited

U.S. PATENT DOCUMENTS

| | | | | |
|---|---|---|---|---|
| 10,912,126 | B2* | 2/2021 | Yoon | H04J 13/0062 |
| 10,952,258 | B2* | 3/2021 | Reial | H04L 5/0053 |
| 11,246,157 | B2* | 2/2022 | Kim | H04L 5/0007 |
| 11,284,440 | B2* | 3/2022 | Qian | H04W 74/0833 |
| 11,412,552 | B2* | 8/2022 | Shin | H04W 74/085 |
| 11,974,325 | B2* | 4/2024 | Lee | H04W 74/0833 |
| 2002/0172187 | A1 | 11/2002 | Shalvi et al. | |
| 2019/0132882 | A1 | 5/2019 | Li et al. | |
| 2019/0254077 | A1 | 8/2019 | Sahlin et al. | |

FOREIGN PATENT DOCUMENTS

| | | |
|---|---|---|
| CN | 110247743 A | 9/2019 |
| WO | WO-2018/131985 A1 | 7/2018 |
| WO | WO-2018/160111 A1 | 9/2018 |
| WO | WO-2019/161044 A1 | 8/2019 |

OTHER PUBLICATIONS

Extended European Search Report for EP Appl. No. 19947592.2, dated May 30, 2023 (11 pages).

TCL Communication, "Prach design considerations for capacity enhancement and beam-sweeping", 3GPP TSG RAN WG1 Meeting #89, R1-1709017, May 19, 2017, Hangzhou, China (9 pages).

CATT, "Further details on NR 4-step RA procedure", 3GPP TSG RAN WG1 Meeting#89 R1-1707464, May 19, 2017 (7 pages).

International Search Report and Written Opinion on PCT/CN2019/109610, mailed Jun. 30, 2020 (7 pages).

TCL, "Prach design Resolving Time Ambiguity and Increasing Capacity", 3GPP TSG RAN WG1 Meeting#89 R1-1708218, May 19, 2017 (8 pages).

First Office Action for CN Appl. No. 201980102620.7, dated Dec. 28, 2024 (with English translation, 17 pages).

Qualcomm Incorporated, "Prach Preamble Design for Capacity Enhancement", 3GPP TSG-RAN WG1 Meeting #89AH, R1-1713380, Jun. 30, 2017, Prague (14 pages).

\* cited by examiner

|  | Cyclic shift list pool for $(v_{11}, v_{12})$ |
|---|---|
| Example 1 | (0, 23), (0, 77) |
| Example 2 | (0, 23), (1, 24) |
| Example 3 | (0, 23), (830, 14) |

Transmit a preamble comprising at least one part, wherein each of the at least one part comprises at least one sub-preamble and the sub-preambles are generated based on a plurality of roots

Receive a preamble comprising at least one part, wherein each of the at least one part comprises at least one sub-preamble and the sub-preambles are generated based on a plurality of roots

Transmit a plurality of preambles, wherein each of the plurality of preambles comprises at least one part, each of the at least one part comprises at least one sub-preamble and the sub-preambles of the plurality of preambles are generated based on a plurality of roots.

Receive a plurality of preambles, wherein each of the plurality of preambles comprises at least one part, each of the at least one part comprises at least one sub-preamble and the sub-preambles in the plurality preambles are generated based on the plurality of roots.

RANDOM ACCESS PREAMBLE FOR NON-TERRESTRIAL NETWORK

This document is directed generally to wireless communications.

Due to the wide service coverage capabilities and reduced vulnerability of space/airborne vehicles to physical attacks and natural disasters compared to terrestrial networks, non-terrestrial networks (NTN) are expected to foster the roll out of 5G service in un-served areas and to upgrade the performance of limited terrestrial networks in underserved areas with low cost.

In NTN, low earth orbiting (LEO) satellite communication has attracted extensive interests in industry for its potential to support high bandwidth and low latency. However, the rapidly moving LEO satellites bring a huge frequency offset. Though a user equipment (UE) generally performs a coarse frequency offset estimation in a downlink synchronization signal detection, a residual frequency offset, however, may still be relatively large, which brings new challenge in a random access procedure of the NTN. Furthermore, a huge time offset brought by propagation delays also exceeds the tolerance of existing PRACH design. Similar challenges are also needed to be addressed in case of the air to ground (ATG) service, in which, the onboard UEs allocated in the airplane are served by terrestrial station.

This document relates to wireless communication methods, systems, and devices for wireless communications, in particular for non-terrestrial network (NTN) and ATG wireless communications, and in particular, to a preamble capable of dealing with high frequency offsets and huge time offset in the NTN wireless communications. However, it is clear for the skilled person that the present document is not limited to these wireless communications but is also applicable to other types of wireless communications.

The present disclosure relates to a wireless communication method, performed by a wireless terminal and provided according to an embodiment of the present disclosure. The wireless communication method includes transmitting, to a wireless network node, a preamble comprising a plurality of parts, wherein each of the plurality of parts comprises at least one sub-preamble and the sub-preambles in the plurality of parts are generated based on a plurality of roots.

Various embodiments may preferably implement the following features:

Preferably, the at least one sub-preamble in each of the plurality of parts is generated based on different roots.

Preferably, the at least one sub-preamble in same part is generated based on a plurality of cyclic shift lists.

Preferably, the at least one sub-preamble in the same part is generated based on one of the plurality of cyclic shift lists.

Preferably, the plurality of cyclic shift lists has the same cyclic shift.

Preferably, the at least one sub-preamble in the same part is the same as each other.

Preferably, each of the plurality of parts has a prefix.

Preferably, the prefix is a cyclic prefix generated based on a tail of each of the plurality of parts.

Preferably, at least one of the plurality of parts has a suffix.

Preferably, the suffix comprises data transmitted in a physical uplink shared channel (PUSCH).

Preferably, the suffix comprises a blank.

Preferably, each of the plurality of parts does not have a suffix.

Preferably, the at least one sub-preamble in each of the plurality of parts is concatenated in the time domain.

Preferably, the plurality of parts is concatenated in the time domain.

Preferably, the plurality of parts is transmitted in different frequency points.

Preferably, the plurality of parts is transmitted at a plurality of random access channel (RACH) occasions.

Preferably, the wireless communication method further comprises receiving, from the wireless network node, occasion configuration information of indicating the plurality of RACH occasions.

Preferably, the occasion configuration information indicates at least one index offset among the plurality of RACH occasions.

Preferably, the occasion configuration information indicates at least one time offset among the plurality of RACH occasions.

Preferably, the occasion configuration information indicates at least one frequency offset among the plurality of RACH occasions.

Preferably, the plurality of RACH occasions is pre-defined as a table and the occasion configuration information indicates at least one index entry of the table.

Preferably, the plurality of RACH occasions is divided into a plurality of occasion groups corresponding to the plurality of parts.

Preferably, the plurality of preambles is transmitted at at least one resource element (RE).

Preferably, the plurality of preambles occupies one RE at the same time.

Preferably, the wireless communication method further comprises receiving, from the wireless network node, preamble configuration information used for generating the sub-preambles in the plurality of parts of the preamble, wherein the preamble configuration information indicates at least one of a length of a Zadoff-Chu sequence, the plurality of roots or a plurality of cyclic shift lists.

The present disclosure relates to a wireless communication method, performed by a wireless network node and provided according to an embodiment of the present disclosure. The wireless communication method includes receiving, from a wireless terminal, a preamble comprising a plurality of parts, wherein each of the plurality of parts comprises at least one sub-preamble and the sub-preambles in the plurality parts are generated based on the plurality of roots.

Various embodiments may preferably implement the following features:

Preferably, the at least one sub-preamble in each of the plurality of parts is generated based on the different roots.

Preferably, the sub-preambles in the plurality of parts are generated based on a plurality of cyclic shift lists.

Preferably, the at least one sub-preamble in the same part is generated based on one of the plurality of cyclic shift lists.

Preferably, the plurality of cyclic shift lists has the same cyclic shift.

Preferably, the at least one sub-preamble in the same part is the same with each other.

Preferably, each of the plurality of parts has a prefix and the prefix is a cyclic prefix generated based on a tail of each of the plurality of parts.

Preferably, at least one of the plurality of parts has a suffix.

Preferably, the suffix comprises data transmitted in a physical uplink shared channel (PUSCH).

Preferably, the suffix comprises a blank.

Preferably, each of the plurality of parts does not have a suffix.

Preferably, wherein the at least one sub-preamble in each of the plurality of parts is concatenated in the time domain.

Preferably, the plurality of parts is concatenated in the time domain.

Preferably, the plurality of parts is received in different frequency points.

Preferably, the plurality of parts is received at a plurality of random access channel (RACH) occasions.

Preferably, the wireless communication method further comprises transmitting, to the wireless terminal, occasion configuration information of indicating the plurality of RACH occasions.

Preferably, the occasion configuration information indicates at least one index offset among the plurality of RACH occasions.

Preferably, the occasion configuration information indicates at least one time offset among the plurality of RACH occasions.

Preferably, the occasion configuration information indicates at least one frequency offset among the plurality of RACH occasions.

Preferably, the plurality of RACH occasions is pre-defined as a table and occasion configuration information indicates at least one index entry of the table.

Preferably, the plurality of RACH occasions is divided into a plurality of occasion groups corresponding to the plurality of parts.

Preferably, the plurality of preambles is transmitted at at least one resource element (RE).

Preferably, the plurality of preambles occupies one RE at the same time.

Preferably, the wireless communication method further comprises transmitting, to the wireless terminal, preamble configuration information used for generating the sub-preambles in the plurality of parts of the preamble, wherein the preamble configuration information indicates at least one of a length of a Zadoff-Chu sequence, the plurality of roots or a plurality of cyclic shift lists.

The present disclosure relates to a wireless communication method for use in a wireless terminal. The wireless communication method comprises transmitting, to a wireless network node, a plurality of preambles, wherein each of the plurality of preambles comprises at least one part, each of the at least one part comprises at least one sub-preamble and the sub-preambles of the plurality of preambles are generated based on a plurality of roots.

Various embodiments may preferably implement the following features:

Preferably, the wireless communication method further comprises generating a plurality of groups, and determining the plurality of preambles from the plurality of groups, wherein each of the plurality of groups comprises at least one candidate preamble generated based on the same root.

Preferably, the wireless communication method further comprises determining one of a plurality of candidate root sets, wherein each of the plurality of candidate root set comprises a plurality of candidate roots, and determining the plurality of preambles from the groups corresponding to the plurality candidate roots in the determined candidate root set.

Preferably, the wireless communication method further comprises generating a plurality of candidate preambles based of the plurality of roots; and determining the plurality of preambles from the plurality of candidate preambles.

Preferably, the number of the plurality of candidate preambles is greater than the number of the plurality of roots.

Preferably, the wireless communication method further comprises determining one of a plurality of candidate root sets, wherein each of the plurality of candidate root set comprises a plurality of candidate roots; and determining candidate preambles corresponding to the plurality candidate roots in the determined candidate root set as the plurality of preambles.

Preferably, at least one of the plurality of candidate roots within each of the plurality of candidate root sets is different from other candidate roots in the same candidate root set.

Preferably, the at least one part of each of the plurality of preambles is concatenated in the time domain.

Preferably, the plurality of preambles is concatenated in the time domain.

Preferably, the plurality of preambles is transmitted in different frequency points.

Preferably, the plurality of preambles is transmitted at a plurality of random access channel (RACH) occasions.

Preferably, the wireless communication method further comprises receiving, from the wireless network node, occasion configuration information of indicating the plurality of RACH occasions.

Preferably, the occasion configuration information indicates at least one index offset among the plurality of RACH occasions.

Preferably, the occasion configuration information indicates at least one time offset among the plurality of RACH occasions.

Preferably, the occasion configuration information indicates at least one frequency offset among the plurality of RACH occasions.

Preferably, the plurality of RACH occasions is pre-defined as a table and the occasion configuration information indicates at least one index entry of the table.

Preferably, the plurality of RACH occasions is divided into a plurality of occasion groups corresponding to the plurality of preambles.

Preferably, the plurality of preambles is transmitted at at least one resource element, RE.

Preferably, the plurality of preambles occupies one RE at the same time.

Preferably, the wireless communication method further comprises receiving, from the wireless network node, preamble configuration information used for generating the plurality of preambles, wherein the preamble configuration information indicates at least one of a length of a Zadoff-Chu sequence, the plurality of roots or a plurality of cyclic shift lists, or the number of the plurality of preambles The present disclosure relates to a wireless communication method for use in a wireless network node. The wireless communication method comprises receiving, from a wireless terminal, a plurality of preambles, wherein each of the plurality of preambles comprises at least one part, each of the at least one part comprises at least one sub-preamble and the sub-preambles of the plurality of preambles are generated based on a plurality of roots.

Various embodiments may preferably implement the following features:

Preferably, the wireless communication method further comprises indicating, to the wireless terminal, a plurality of candidate root sets, wherein each of the plurality of candidate root sets comprises a plurality candidate roots of generating the plurality of preambles.

Preferably, the plurality of candidate root sets is indicated via at least one of a radio resource control signaling, a system information block, or a master information block.

Preferably, the at least one part of each of the plurality of preambles is concatenated in the time domain.

Preferably, the plurality of preambles is concatenated in the time domain.

Preferably, the plurality of preambles is received in different frequency points.

Preferably, the plurality of preambles is received at a plurality of random access channel (RACH) occasions.

Preferably, the occasion configuration information indicates at least one index offset among the plurality of RACH occasions.

Preferably, the occasion configuration information indicates at least one time offset among the plurality of RACH occasions.

Preferably, the occasion configuration information indicates at least one frequency offset among the plurality of RACH occasions.

Preferably, the plurality of RACH occasions is pre-defined as a table and the occasion configuration information indicates at least one index entry of the table.

Preferably, the plurality of RACH occasions is divided into a plurality of occasion groups corresponding to the plurality of preambles.

Preferably, the plurality of preambles is transmitted at at least one resource element (RE).

Preferably, the plurality of preambles occupies one RE at the same time.

Preferably, the wireless communication method further comprises transmitting, to the wireless terminal, preamble configuration information used for generating the plurality of preambles, wherein the preamble configuration information indicates at least one of a length of a Zadoff-Chu sequence, the plurality of roots or a plurality of cyclic shift lists, the number of the plurality of preambles or the number of the plurality of preambles.

The present disclosure relates to a wireless terminal and provided according to an embodiment of the present disclosure. The wireless terminal comprises a communication unit configured to transmit, to a wireless network node, a preamble comprising a plurality of parts, wherein each of the plurality of parts comprises at least one sub-preamble and the sub-preambles in the plurality of parts are generated based on a plurality of roots.

Various embodiments may preferably implement the following feature:

Preferably, the wireless terminal further comprises a processor being configured to perform any of the aforementioned method steps.

The present disclosure relates to a wireless network node and provided according to an embodiment of the present disclosure. The wireless network node comprises a communication unit configured to receive, from a wireless terminal, a preamble comprising a plurality of parts, wherein each of the plurality of parts comprises at least one sub-preamble and the sub-preambles in the plurality of parts are generated based on a plurality of roots.

Various embodiments may preferably implement the following feature:

Preferably, the wireless network node further comprises a processor being configured to perform any of the aforementioned method steps.

The present disclosure relates a wireless terminal comprising a communication unit configured to transmit, to a wireless network node, a plurality of preambles, wherein each of the plurality of preambles comprises at least one part, each of the at least one part comprises at least one sub-preamble and the sub-preambles of the plurality of preambles are generated based on a plurality of roots.

Various embodiments may preferably implement the following feature:

Preferably, the wireless terminal further comprises a processor being configured to perform any of the aforementioned method steps.

The present disclosure relates to a wireless network node comprising a communication unit configured to receive, from a wireless terminal, a plurality of preambles, wherein each of the plurality of preambles comprises at least one part, each of the at least one part comprises at least one sub-preamble and the sub-preambles of the plurality of preambles are generated based on a plurality of roots.

Various embodiments may preferably implement the following feature:

Preferably, the wireless network node further comprises a processor being configured to perform any of the aforementioned method steps.

The present disclosure also relates to a computer-readable program medium code stored thereupon is disclosed according to an embodiment of the present disclosure, and the code, when executed by a processor, causing the processor to implement a method recited in any of foregoing described methods.

The above and other aspects and their implementations are described in greater detail in the drawings, the descriptions, and the claims.

FIG. 24 shows a flowchart of a process according to an embodiment of the present disclosure.

FIG. 25 shows a flowchart of a process according to an embodiment of the present disclosure.

FIG. 26 shows a flowchart of a process according to an embodiment of the present disclosure.

FIG. 27 shows a flowchart of a process according to an embodiment of the present disclosure.

Figure 1:
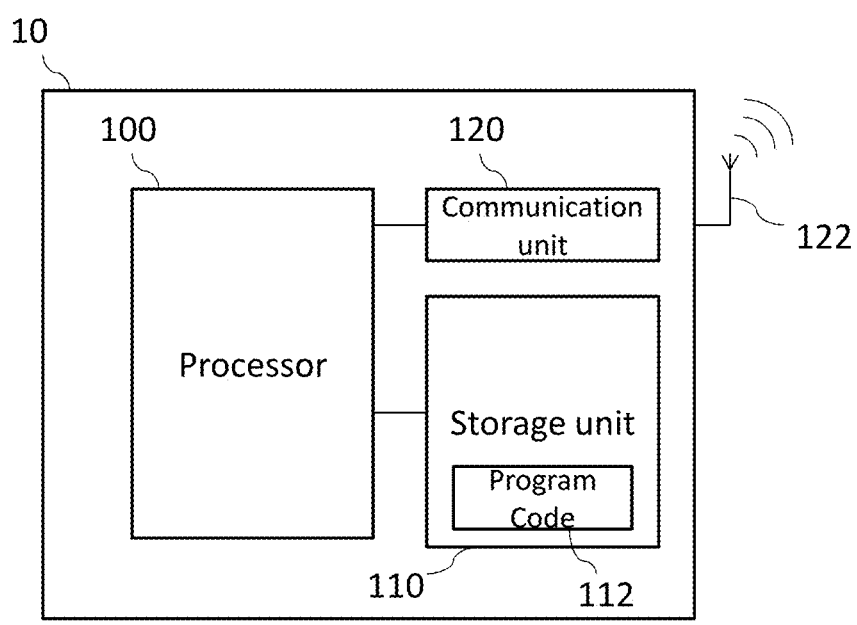
FIG. 1 shows an example of a schematic diagram of a wireless terminal according to an embodiment of the present disclosure.

FIG. 1 relates to a schematic diagram of a wireless terminal 10 according to an embodiment of the present disclosure. The wireless terminal 10 may be a user equipment (UE), a mobile phone, a laptop, a tablet computer, an electronic book or a portable computer system and is not limited herein. The wireless terminal 10 may include a processor 100 such as a microprocessor or Application Specific Integrated Circuit (ASIC), a storage unit 110 and a communication unit 120. The storage unit 110 may be any data storage device that stores a program code 112, which is accessed and executed by the processor 100. Embodiments of the storage unit 112 include but are not limited to a subscriber identity module (SIM), read-only memory (ROM), flash memory, random-access memory (RAM), hard-disk, and optical data storage device. The communication unit 120 may a transceiver and is used to transmit and receive signals (e.g. messages or packets) according to processing results of the processor 100. In an embodiment, the communication unit 120 transmits and receives the signals via an antenna 122 shown in FIG. 1.

In an embodiment, the storage unit 110 and the program code 112 may be omitted and the processor 100 may include a storage unit with stored program code.

The processor 100 may implement any one of the steps in exemplified embodiments on the wireless terminal 10.

The communication unit 120 may be a transceiver. The communication unit 120 may as an alternative or in addition be combining a transmitting unit and a receiving unit configured to transmit and to receive, respectively, signals to and from a wireless network node (e.g. a base station).

Figure 2:
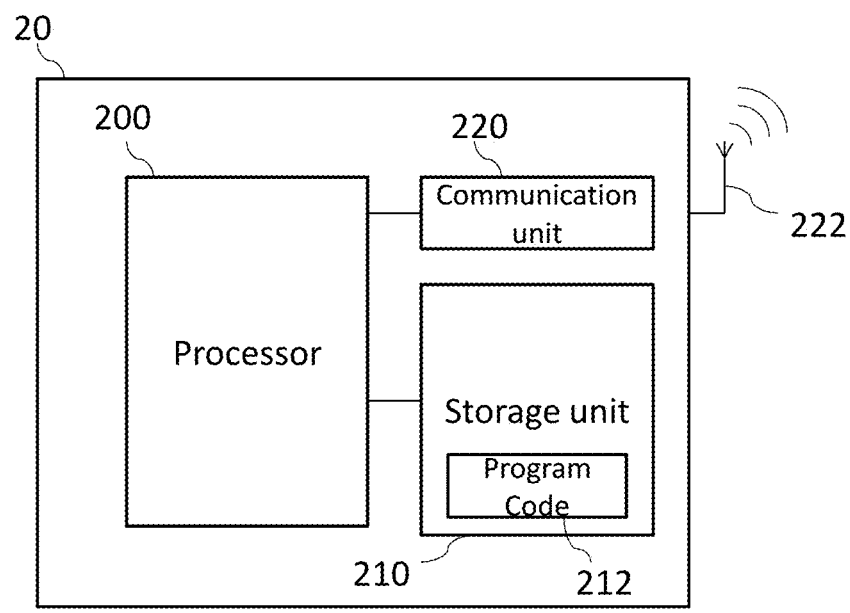
FIG. 2 shows an example of a schematic diagram of a wireless network node according to an embodiment of the present disclosure.

FIG. 2 relates to a schematic diagram of a wireless network node 20 according to an embodiment of the present disclosure. The wireless network node 20 may be a base station (BS), a network entity, a Mobility Management Entity (MME), Serving Gateway (S-GW), Packet Data Network (PDN) Gateway (P-GW), or Radio Network Controller (RNC), and is not limited herein. The wireless network node 20 may include a processor 200 such as a microprocessor or ASIC, a storage unit 210 and a communication unit 220. The storage unit 210 may be any data storage device that stores a program code 212, which is accessed and executed by the processor 200. Examples of the storage unit 212 include but are not limited to a SIM, ROM, flash memory, RAM, hard-disk, and optical data storage device. The communication unit 220 may be a transceiver and is used to transmit and receive signals (e.g. messages or packets) according to processing results of the processor 200. In an example, the communication unit 220 transmits and receives the signals via an antenna 222 shown in FIG. 2.

In an embodiment, the storage unit 210 and the program code 212 may be omitted. The processor 200 may include a storage unit with stored program code.

The processor 200 may implement any steps described in exemplified embodiments on the wireless network node 20.

The communication unit 220 may be a transceiver. The communication unit 220 may as an alternative or in addition be combining a transmitting unit and a receiving unit configured to transmit and to receive, respectively, signals to and from a wireless terminal (e.g. a user equipment).

In an existing communication system, a physical random access channel (PRACH) is used to transmit access requests of wireless network terminals to a wireless network node (e.g. BS). The wireless network node detects the wireless network terminals and their time delays according to the PRACH preambles and accordingly provides the Timing Advance (TA) information to the wireless network terminals. The preambles may be constructed based on Zadoff-Chu (ZC) sequences (e.g. with a length of 139 or 839) and cyclic shifts. For a given cell, 64 different random access sequences may be provided to all wireless network terminals. The corresponding root pool and cyclic shift pool are broadcast to all wireless network terminals and each of the wireless network terminals randomly chooses one root and one cyclic shift from the corresponding root pool and cyclic shift pool to generate its random access signal.

Typically, a preamble is detected by a correlation peak at the receiver (e.g. wireless network node) side. Note that, the existing preamble cannot support a scenario with a frequency offset larger than half of a subcarrier spacing because the correlation peak shifted by the frequency offset may fall into another user's detection window. This is why a larger cyclic shift interval is used in high speed scenarios, where high frequency offsets are expected. Meanwhile, time offsets are also required to be less than the length of a cyclic prefix (CP). Since the CP in each of the preamble formats in an existing communication system may be less than 1 ms, the preambles formats in the existing communication system also cannot support the NTN or air to ground (ATG) wireless communications featured with the huge time offsets.

In an embodiment, the present disclosure proposes a preamble, in particular, for the NTN which is featured by the huge time offsets and the high frequency offsets. The proposed preamble comprises a plurality of parts and each of the plurality of parts comprises at least one sub-preamble. For example, the proposed preamble may have N parts and the number of sub-preambles in the N parts is $N_{SP}$ (where $N \geq 2$ and $N_{SP} \geq 2$), wherein each of the $N_{SP}$ sub-preambles is generated by using a ZC sequence characterized by a root u and a cyclic shift v.

In an embodiment, the sub-preambles in each of the plurality of parts are concatenated in the time domain.

In an embodiment, each of the plurality of parts has a prefix. For example, the prefix may be a cyclic prefix.

In an embodiment, at least one of the plurality of parts has a suffix. In an example, the suffix comprises data and/or blank.

In an embodiment, the proposed preamble may only have only 1 part comprising at least one sub-preamble. That is, the proposed preamble may comprises at least one part, each of the at least one part comprises at least one sub-preamble concatenated in the time domain and each of the at least one part may have a prefix and/or a suffix.

In an embodiment, the proposed preamble utilizes $N_u$ different roots to generate the sub-preambles in the plurality of parts, where $N_u \geq 2$. In addition, at least one sub-preamble corresponding to each of the roots is generated based on a corresponded cyclic shift list. For example, the preamble can be expressed by:

$$(u_1, v_{11}, v_{12}, \ldots, v_{1n_1}), (u_2, v_{21}, v_{22}, \ldots, v_{2n_2}),$$
$$\ldots, (u_{N_u}, v_{N_u 1}, v_{N_u 2}, \ldots, v_{N_u n_{N_u}})$$

In this example, the $N_{SP}$ sub-preambles are generated based on roots $u_1, u_2, \ldots, u_{N_u}$ and the cyclic shifts $v_{11}, v_{12}, \ldots, v_{1n_1}, v_{21}, v_{22}, \ldots, v_{2n_2}, \ldots,$ $$v_{N_u 1}, v_{N_u 2}, \ldots v_{N_u n_{N_u}},$$

where $n_1 + n_2 + \ldots + n_{N_u} = N_{SP}$. More specifically, the preamble comprises sub-preambles generated based on ZC sequences characterized by the root $u_1$ and a cyclic shift list with the cyclic shifts $v_{11}, v^{12}, \ldots, n_{N_u} = n_{SP}$, sub-preambles generated based on ZC sequences characterized by the root $u_2$ and a cyclic shift list with the cyclic shifts $v_{21}, v_{22}, \ldots, v_{2n_2}$, and so on.

In an embodiment, the cyclic shift lists corresponding to different roots may share the same cyclic shift(s). In other words, the different cyclic shift lists may comprise the same cyclic shift(s). In an embodiment, the cyclic shift lists may partially overlap to each other (i.e. two cyclic shift lists may share at least one cyclic shift). In an embodiment, the sub-preambles may be generated based on different roots and the same cyclic shift (e.g. based on the ZC sequences characterized by different roots and the same cyclic shift.)

As discussed above, the exemplary NTN is featured by high frequency offsets and huge time offsets. Under such a condition, a correlation peak corresponding to a wireless network terminal's preamble may shift to another user's detection window and may lead to wrong detection results. In order to solve the problem caused by the high frequency offsets, the proposed preamble adopts different roots to facilitate high frequency offset estimation. Moreover, the at least one sub-preamble in each part of the proposed preamble is concatenated in the time domain, so as to deal with the huge time offsets. Furthermore, a combination of the correlation peaks (e.g. intervals among cyclic shifts in the cyclic shift list) may be utilized to identify a specific user.

In the following, various embodiments of the proposed preamble are exemplified for illustrating further details of the proposed preamble.

Figure 3:
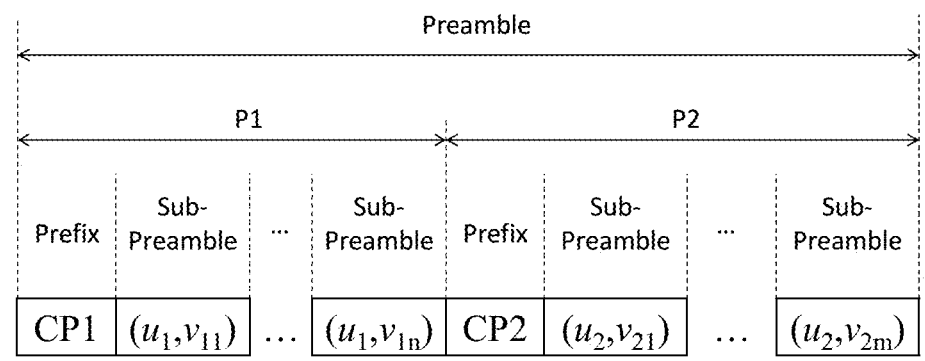
FIG. 3 shows a schematic diagram of a preamble according to an embodiment of the present disclosure.

FIG. 3 shows a schematic diagram of a preamble according to an embodiment of the present disclosure. As shown in FIG. 3, two roots $u_1$ and $u_2$ are used and cyclic shift lists corresponding to the roots $u_1$ and $u_2$ are $(v_{11}, v_{12}, \ldots, v_{1n})$ and $(v_{21}, v_{22}, \ldots, v_{2m})$, respectively. In this embodiment, the sub-preambles are divided into two parts P1 and P2, wherein the part P1 has a prefix CP1 and comprises the sub-preambles generated based on ZC sequences characterized by the root $u_1$ and the cyclic shift list $(v_{11}, v_{12}, \ldots, v_{1n})$ and the part P2 has a prefix CP2 and comprises the sub-preambles generated based on ZC sequences characterized by the root $u_2$ and the cyclic shift list $(v_{21}, v_{22}, \ldots, v_{2m})$. In this example, not only the sub-preambles in each of the parts P1 and P2 are concatenated in the time domain but also the parts P1 and P2 are concatenated in the time domain to form the preamble.

In an example, the cyclic shift list $(v_{11}, v_{12}, \ldots, v_{1n})$ and/or $(v_{21}, v_{22}, \ldots, v_{2m})$ is a unique signature for identifying preambles transmitted from a specific user in a random access procedure. The distinctiveness of the cyclic shift list lies in an interval (e.g. gap) between every two cyclic shifts in the cyclic shift list (e.g. the intervals of every two adjacent cyclic shifts (i.e. $V_{12}$-$V_{11}$, $V_{13}$-$V_{12}$, ..., $V_{1n}$-$V_{1(n-1)}$)) When two cyclic shift lists are considered as identical, these two cyclic shift lists should overlap with each other with respect to a cyclic offset s over a length L (i.e. the intervals among the cyclic shifts in a cyclic shift list are the same with corresponding intervals among the cyclic shifts in another cyclic shift list).

In an embodiment, the

Figures 4, 5:
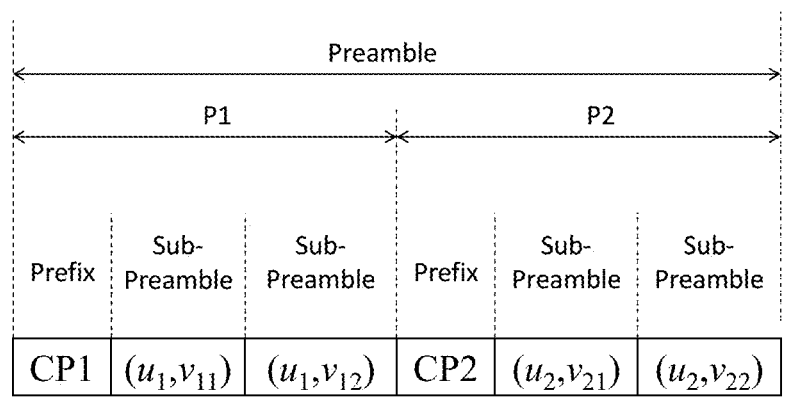
FIG. 4 shows a table of exemplified cyclic shift list pools according to an embodiment of the present disclosure.
FIG. 5 shows a schematic diagram of a preamble according to an embodiment of the present disclosure.

FIG. 4 shows a table of exemplified cyclic shift list pools according to an embodiment of the present disclosure. In this embodiment, the cyclic shift list comprises two cyclic shifts and $v_{12}$ and a length L (of the ZC sequence) is 839. In the example 1 shown in FIG. 4, the two cyclic shift lists are different from each other since the interval between the cyclic shifts $v_{11}$ and $v_{12}$ are 24 and 88, respectively, and are apparently different. Different from example 1, the two cyclic shift lists in example 2 are regarded as the same because the interval between the adjacent cyclic shifts $v_{11}$ and $v_{12}$ in the two cyclic shift lists are both 24. Thus, the cyclic shift list pool of the example 2 is an incorrect example since the two cyclic shift lists overlap each other. Similar to the example 2, the example 3 shown in FIG. 4 is also an incorrect example because the cyclic shift list (830, 14) overlaps with the cyclic shift list (0, 23) over the length L ((830, 14)={[(0, 23)+830)] mod 839}, wherein "mod" is a modulo function which returns a remainder of performing the division of one number by another number).

In an embodiment, the mapping between the cyclic shift lists on any two different roots must be a 1-to-1 mapping. In other words, once a cyclic shift list is determined for one of the plurality of roots, the cyclic shift lists corresponding to remaining roots are also determined. For example, the cyclic shift lists $(v_{11}, v_{12}, \ldots, v_{1n})$ and $(v_{21}, v_{22}, \ldots, v_{2m})$ used in the embodiment of FIG. 3 may be selected (by the wireless network terminal or the wireless network node) from two identical or different cyclic shift list pools. Due to the 1-to-1 mapping relationship between the cyclic shift lists $(v_{11}, v_{12}, \ldots, v_{1n})$ and $(v_{21}, v_{22}, \ldots, v_{2m})$, the cyclic shift list $(v_{11}, v_{12}, \ldots, v_{1n})$ is determined when the cyclic shift list $(v_{21}, v_{22}, \ldots, v_{2m})$ is selected, and vice versa.

In an example, the prefixes CP1 and CP2 shown in FIG. 3 may be blanks or generated based on tails of the corresponding part.

In the embodiment shown in FIG. 3, each part of the preamble does not have a suffix.

FIG. 5 shows a schematic diagram of a preamble according to an embodiment of the present disclosure. In this embodiment, the preamble comprises sub-preambles generated based on a root $u_1$ and a cyclic shift list $(v_{11}, v_{12})$ and sub-preambles generated based on a root $u_2$ and a cyclic shift list $(v_{21}, v_{22})$. In addition, the sub-preambles are divided into two parts P1 and P2, wherein the part P1 has a prefix CP1 and the part P2 has a prefix CP2. In an example, a period of each of the prefixes CP1 and CP2 is greater than a maximum time offset. For example, the maximum time offset may be the largest differential round trip delay in a low earth orbit (LEO) beam (e.g. 1.5 ms). In an example, the prefix CP1 is generated based on the tail of the concatenated sub-preambles generated based on the root $u_1$ and the cyclic shift list $(v_{11}, v_{12})$ and the prefix CP2 is generated based on the tail of the concatenated sub-preambles generated based on the root $u_2$ and the cyclic shift list $(v_{21}, v_{22})$. Based on the preamble, the receiver (e.g. wireless network node) acquires several correlation peaks for every roots and recognizes different users according to the gaps between the peaks (i.e. the intervals between the cyclic shifts $v_{11}$ and $v_{12}$ and/or between the cyclic shifts $v_{21}$ and $v_{22}$).

Figure 6:
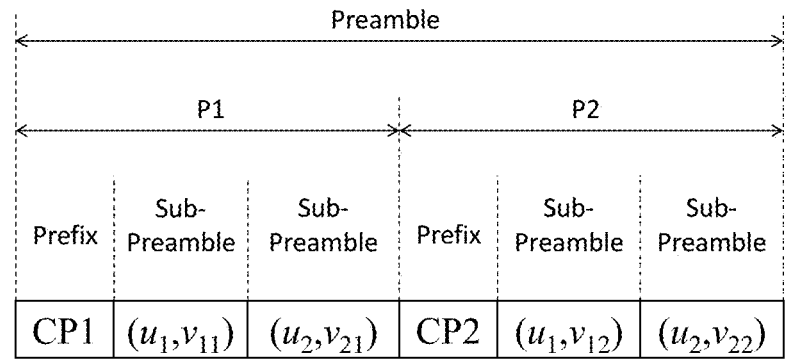
FIG. 6 shows a schematic diagram of a preamble according to an embodiment of the present disclosure.

FIG. 6 shows a schematic diagram of a preamble according to an embodiment of the present disclosure. Similar to the preamble shown in FIG. 5, the preamble of FIG. 6 comprises sub-preambles generated based on the root $u_1$ and the cyclic shift list $(v_{11}, v_{12})$ and sub-preambles generated based on the root $u_2$ and the cyclic shift list $(v_{21}, v_{22})$, and the sub-preambles are divided into the parts P1 and P2 which respectively have prefixes CP1 and CP2. In FIG. 6, the part P1 comprises the sub-preamble generated based on the root $u_1$ and the cyclic shift $v_{11}$ and the sub-preamble generated based on the root $u_2$ and the cyclic shift $v_{21}$; and the part P2 comprises the sub-preamble generated based on the root $u_2$ and the cyclic shift $v_{12}$ and the sub-preamble generated based on the root $u_2$ and the cyclic shift $v_{22}$. That is, the sub-preambles in the same part of the preamble may be generated based on different roots.

Figure 7:
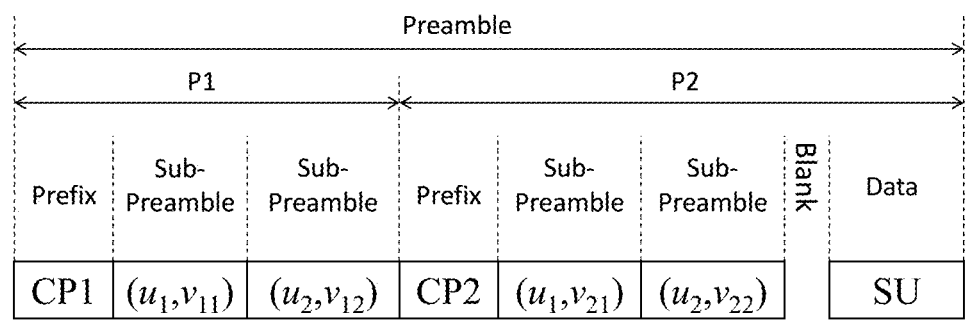
FIG. 7 shows a schematic diagram of a preamble according to an embodiment of the present disclosure.

FIG. 7 shows a schematic diagram of a preamble according to an embodiment of the present disclosure. The embodiment shown in FIG. 7 is similar to the embodiment shown in FIG. 5, thus the components with similar functions use the same symbols. In an embodiment, each part of the preamble may have a suffix. In FIG. 7, the part P2 comprising the prefix CP2 and the sub-preambles generated based on the root $u_2$ and the cyclic shift list $(v_{21}, v_{22})$ has a suffix SU. In an example, the suffix SU comprises data, e.g., transmitted at a physical uplink shared channel (PUSCH). In addition, there is a blank between the sub-preambles and the suffix SU. The blank also can be regarded as parts of the suffix SU. In other words, the suffix SU may be a mixture of (e.g. comprises) the blank and the data.

Figure 8:
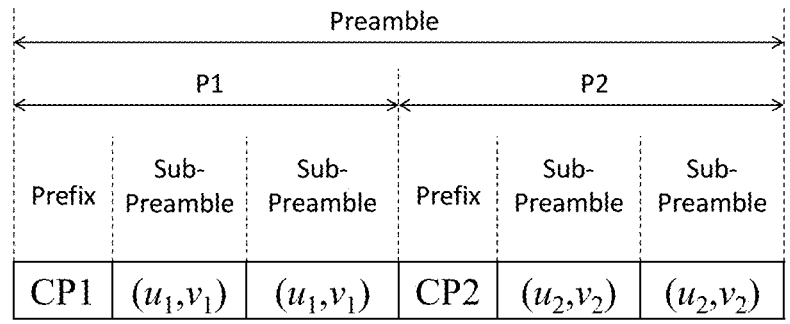
FIG. 8 shows a schematic diagram of a preamble according to an embodiment of the present disclosure.

FIG. 8 shows a schematic diagram of a preamble according to an embodiment of the present disclosure. Similar to the preamble shown in FIG. 5, the preamble of FIG. 8 comprises sub-preambles generated based on the roots $u_1$ and $u_2$ and the sub-preambles are divided into two parts P1 and P2 which respectively have prefixes CP1 and CP2. In this embodiment, the cyclic shift lists corresponding to the roots $u_1$ and $u_2$ are $(v_1, v_1)$ and $(v_2, v_2)$. In other words, each root only has one corresponding cyclic shift. Under such a condition, each two different preambles (e.g. preambles of two different users) in one cell must have different roots for distinguishing from each other. The total number of preambles in single cell may be largely decreased, which may increase correlation noise in the receiver (e.g. wireless network node) side. Note that, the preamble shown in FIG. 8 is still able to endure the high frequency offset and the huge time offset.

According to the preamble shown in FIG. 8, the sub-preambles in each part of the preamble may be the same in an embodiment.

Figure 9:
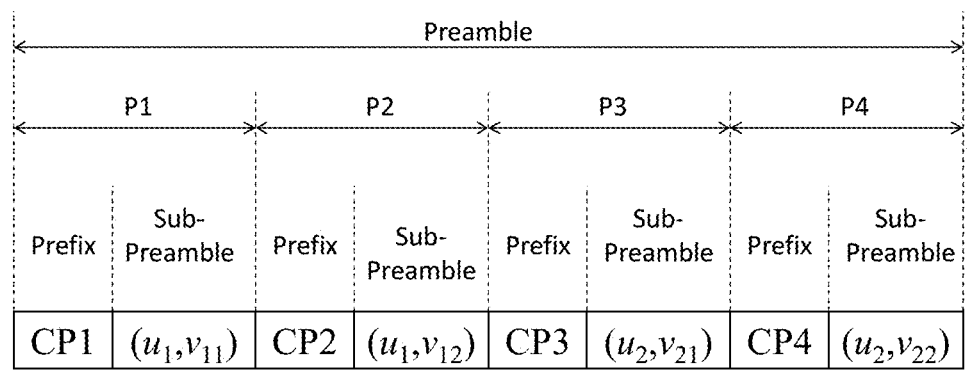
FIG. 9 shows a schematic diagram of a preamble according to an embodiment of the present disclosure.

FIG. 9 shows a schematic diagram of a preamble according to an embodiment of the present disclosure. Similar to the preamble shown in FIG. 5, the preamble shown in FIG. 9 comprises sub-preambles generated based on a root $u_1$ and a cyclic shift list $(v_{11}, v_{12})$ and sub-preambles generated based on a root $u_2$ and a cyclic shift list $(v_{21}, v_{22})$. In this embodiment the sub-preambles are divided into four parts P1, P2, P3 and P4 which respectively have prefixes CP1, CP2, CP3 and CP4. The preamble shown in FIG. 9 may be adopted when the frequency offset is high and the time offset is less than a length of one orthogonal frequency-division multiplexing (OFDM) symbol. When receiving the preamble shown in FIG. 9, the receiver (e.g. wireless network node) independently detects positions of correlation peaks for each sub-preamble and the detected positions can be used to estimate the time and frequency offsets.

Figure 10:
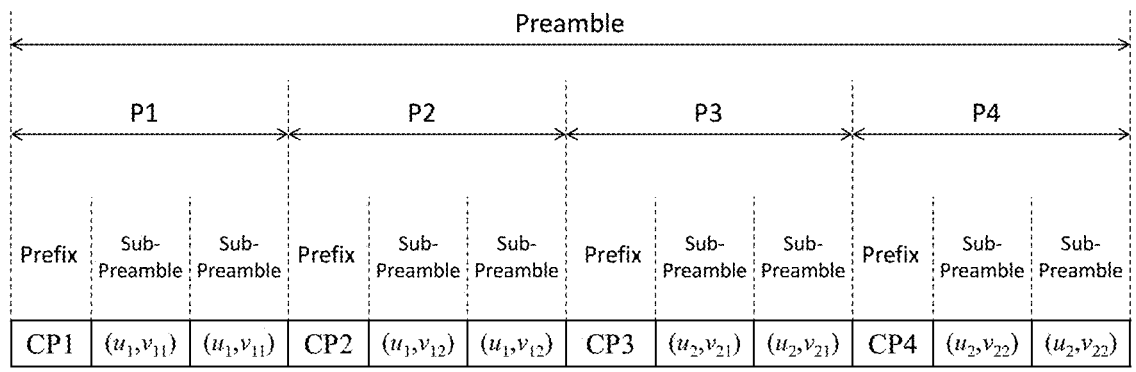
FIG. 10 shows a schematic diagram of a preamble according to an embodiment of the present disclosure.

FIG. 10 shows a schematic diagram of a preamble according to an embodiment of the present disclosure. As shown in FIG. 5, each root may have more than one cyclic shift, so as to extend the total number of preambles in a single cell. In the receiver side, the correlation peaks for different cyclic shifts are mixed and need to be differentiated according to the distances among the correlation peaks (e.g. corresponding to the intervals among the cyclic shifts). In an example, the peaks generated by different cyclic shifts may be separated by the prefixes. With this in mind, the sub-preambles comprised in the preamble shown in FIG. 10 are divided into four parts P1, P2, P3 and P4 and each of the parts P1, P2, P3 and P4 has a prefix. Thus, the parts P1, P2, P3 and P4 can be correlated independently and the four detected correlation peaks would not affect each other.

Figure 11:
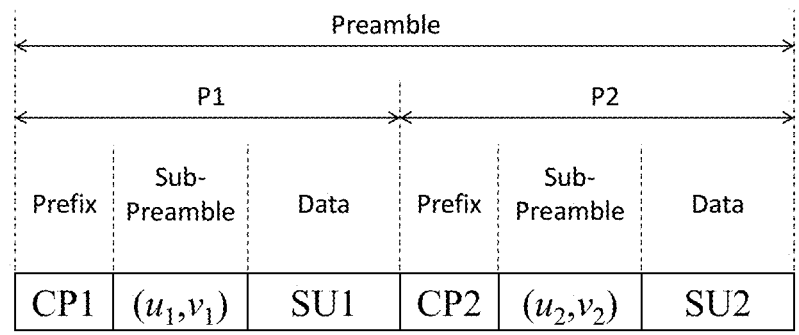
FIG. 11 shows a schematic diagram of a preamble according to an embodiment of the present disclosure.

FIG. 11 shows a schematic diagram of a preamble according to an embodiment of the present disclosure. In this embodiment, the suffix is used as PUSCH to transmit some data along with the PRACH preamble. In FIG. 11, the preamble comprises a sub-preamble generated based on a root $u_1$ and a cyclic shift $v_1$ and a sub-preamble generated based on a root $u_2$ and a cyclic shift $v_2$. The sub-preambles are divided into two parts P1 and P2 which respective have prefixes CP1 and CP2. In this embodiment, the parts P1 and P2 respectively have suffixes SU1 and SU2, which are utilized for transmitting data along with the preamble of the PRACH. In an example, the data is transmitted in the PUSCH and locations of the PUSCH are determined by the location of the corresponding sub-preambles.

Figure 12:
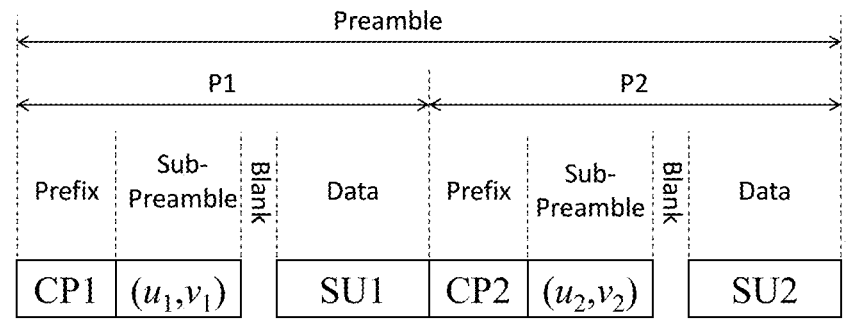
FIG. 12 shows a schematic diagram of a preamble according to an embodiment of the present disclosure.

FIG. 12 shows a schematic diagram of a preamble according to an embodiment of the present disclosure. The embodiment shown in FIG. 12 is similar to that shown in FIG. 11, thus the components with the similar functions use the same symbols. Different from the preamble shown in FIG. 11, the preamble shown in FIG. 12 has 2 blanks between the sub-preamble and the suffix. In an example, the blank may be regarded as part of the suffix. In other words, the suffixes SU1 and SU2 are mixtures of the blank and the data or the suffixes SU1 and SU2 comprises the blank and the data. In another example, the suffixes SU1 and SU2 comprise merely blanks.

In an embodiment, the blank between the sub-preamble and the suffix is pre-defined in the structure of the preamble.

In an embodiment, the blank between the sub-preamble and the suffix exists because of limitations of predefined rules of the wireless communications. For example, the blank may be a set of resources in which the wireless network terminal is not allowed, e.g. by the predefined rules, to transmit the suffix (i.e. the data of the PUSCH).

In an embodiment, the sub-preambles in different parts may not be concatenated in the time domain.

Figure 13:
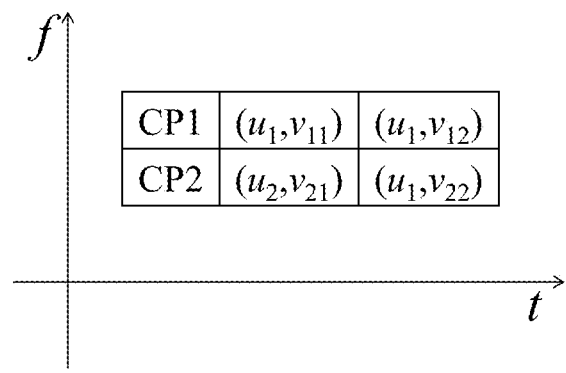
FIG. 13 shows a schematic diagram of a preamble according to an embodiment of the present disclosure.

FIG. 13 shows a schematic diagram of a preamble according to an embodiment of the present disclosure. In this embodiment, the preamble comprises sub-preambles generated based on the root $u_1$ and the cyclic shift list $(v_{11}, v_{12})$ and sub-preambles generated based on the root $u_2$ and the cyclic shift list $(v_{21}, v_{22})$. In addition, the sub-preambles are divided into two parts, wherein one of the parts has the prefix CP1 and another of the parts has the prefix CP2. As shown in FIG. 13, the sub-preambles corresponding to the same part are concatenated in the time domain and the parts are distributed at different frequency points. Note that, the frequency points distributed to the parts are adjacent in FIG. 13. In an embodiment, the frequency points distributed to the parts may be separated. That is, the parts may be separately distributed at the same time point but at different frequency points.

Figure 14:
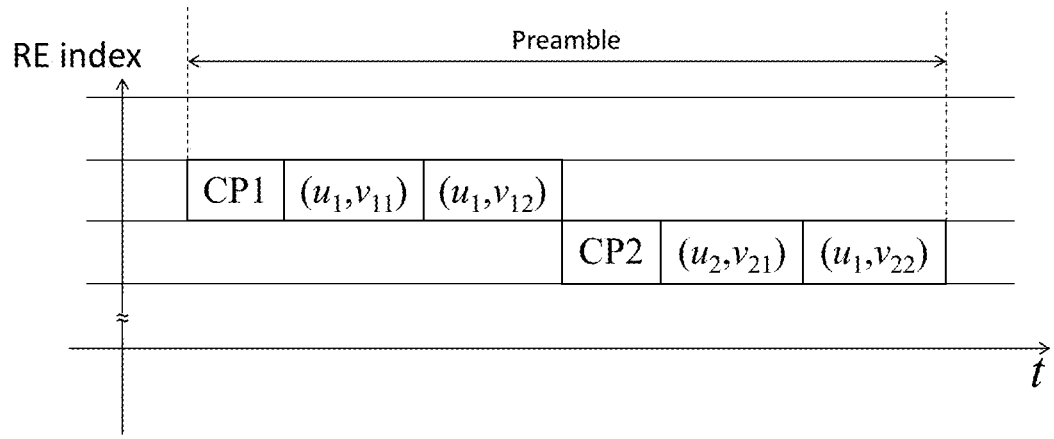
FIG. 14 shows a schematic diagram of a preamble according to an embodiment of the present disclosure.

FIG. 14 shows a schematic diagram of a preamble according to an embodiment of the present disclosure. In a scenario of internet of things (IoT), the signal may need to be transmitted in a narrow band. Since the proposed preamble is able to resist the high frequency offset because adopting multiple roots, the needed band of the proposed preamble may be very small even if the communication channel has the high frequency offset. As shown in FIG. 14, the preamble comprises sub-preambles generated based on the root $u_1$ and the cyclic shift list ($v_{11}$, $v_{12}$) and sub-preambles generated based on the root $u_2$ and the cyclic shift list ($v_{21}$, $v_{22}$). The preamble comprises two parts and each part is transmitted by resource elements (REs) with different indexes. In this embodiment, the preamble only occupies one RE at the same time. That is, the parts of the preamble may be transmitted at at least one RE. In an embodiment, the proposed preamble may occupy a few REs or a few sub-carriers at the same time.

Figure 15:
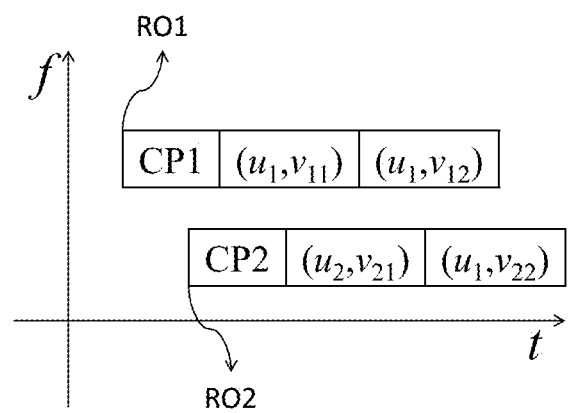
FIG. 15 shows a schematic diagram of a preamble according to an embodiment of the present disclosure.

FIG. 15 shows a schematic diagram of a preamble according to an embodiment of the present disclosure. Similar to the embodiment shown in FIG. 13, the preamble comprises sub-preambles generated based on the root $u_1$ and the cyclic shift list ($v_{11}$, $v_{12}$) and sub-preambles generated based on the root $u_2$ and the cyclic shift list ($v_{21}$, $v_{22}$) and the sub-preambles are divided into 2 parts, wherein one of the parts has the prefix CP1 and another of the parts has the prefix CP2. In this embodiment, the sub-preambles corresponding to the same part are concatenated in the time domain and the parts are distributed at different random access channel (RACH) occasions (ROs). As shown in FIG. 13, the part comprises the prefix CP1 and the sub-preambles generated based on the root $u_1$ and the cyclic shift list ($v_{11}$, $v_{12}$) is distributed (e.g. transmitted) at an RACH occasion RO1 and the part comprises the prefix CP2 and the sub-preambles generated based on the root the root $u_2$ and the cyclic shift list ($v_{21}$, $v_{22}$) is distributed at an RACH occasion RO2.

In an embodiment, the RACH occasions of distributing the parts of the preamble are indicated by the receiver (e.g. wireless network node). For example, the receiver may transmit (e.g. broadcast) occasion configuration information (e.g. a signaling) to the wireless network terminal, to indicate the RACH occasions of the distributing parts of the preamble. For example, the receiver may transmit the occasion configuration information in system information block (SIB).

In an example, the occasion configuration information is configured to indicate at least one index offset between two adjacent RACH occasions among the plurality of RACH occasions and the wireless network terminal is able to determine the plurality of RACH occasions based on a first RACH occasion of transmitting a first part and the at least one index offset. More specifically, there may be a plurality of RACH occasion candidates which are labeled with corresponding numerical indexes. After receiving the RACH occasion configuration indicating the at least one index offset among the indexes of the plurality of RACH occasion candidates, the wireless network terminal determines the first RACH occasion of transmitting the first part among the plurality of parts and determines the remaining RACH occasions of transmitting the remaining parts based on the first RACH occasion and the at least one index offset.

In an example, the preamble is divided into two parts and each part comprises at least one sub-preamble. In this example, the occasion configuration information received from the receiver may indicate one index offset Δindex. Based on the indicated index offset Δindex and the RACH occasion of transmitting one part of the preamble, the wireless network terminal is able to determine the RACH occasion of transmitting another part of the preamble.

In an example, the preamble is divided into 3 parts and each part comprising at least one sub-preamble. In this example, the occasion configuration information received from the receiver may indicate two index offsets Δindex1 and Δindex2. Based on the indicated index offsets Δindex1 and Δindex2 and the RACH occasion of transmitting one part of the preamble, the wireless network terminal is able to determine the RACH occasions of transmitting the remaining 2 parts of the preamble.

In an example, the occasion configuration information indicates at least one time offset and/or at least one frequency offset. In this example, the wireless network terminal is able to determine the plurality of RACH occasions based on the RACH occasion of transmitting a first part, the at least one time offset and/or the at least one frequency offset.

In an example, the preamble is divided into two parts and each part comprises at least one sub-preamble. In this example, the occasion configuration information received from the receiver indicates one time offset Δt and one frequency offset Δf. Based on the indicated time offset Δt, the frequency offset Δf and the RACH occasion of transmitting one part of the preamble, the wireless network terminal is able to determine the RACH occasion of transmitting another part of the preamble.

Figure 16:
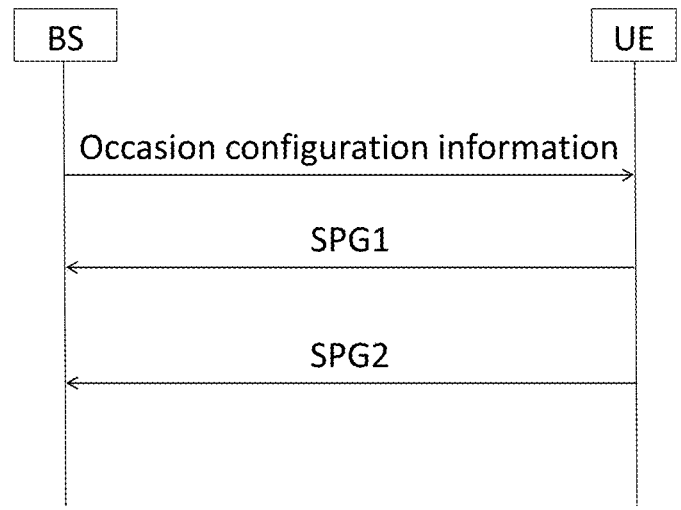
FIG. 16 shows a schematic diagram of a process according to an embodiment of the present disclosure.

FIG. 16 shows a schematic diagram of a process according to an embodiment of the present disclosure. In this embodiment, the preamble transmitted from the wireless network terminal to the wireless network node (e.g. receiver) comprises two parts SPG1 and SPG2 (e.g. the part comprising the prefix CP1 and the sub-preambles generated based on the cyclic shift list ($v_{11}$, $v_{12}$) and the part comprising the prefix CP2 and the sub-preambles generated based on the cyclic shift list ($v_{21}$, $v_{22}$) shown in FIG. 15). As shown in FIG. 16, the wireless network node broadcasts the RACH occasion configuration information to the wireless network terminal. After receiving the RACH occasion configuration information, the wireless network terminal is able to determine a first RACH occasion of transmitting one of the parts SPG1 and SPG2 and to determine a second RACH occasion of transmitting another of the parts SPG1 and SPG2 based on the first RACH occasion and the RACH occasion configuration information. The wireless network terminal therefore can transmit the parts SPG1 and SPG2 respectively at the first RACH occasion and the second RACH occasion.

Figure 17:
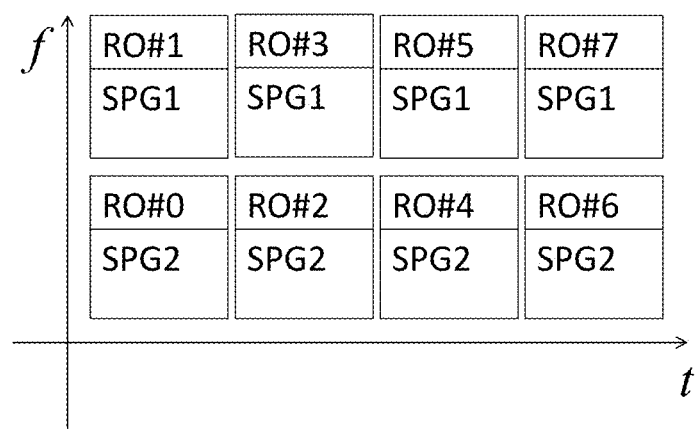
FIG. 17 shows a schematic diagram of a table of locating RACH occasions of transmitting the parts according to an embodiment of the present disclosure.

FIG. 17 shows a schematic diagram of a table of locating RACH occasions of transmitting the parts according to an embodiment of the present disclosure. In this embodiment, the number of RACH occasions in frequency domain at one time stamp is two (e.g. setting a parameter msg1-FDM to 2), the RACH occasions of one frequency point are labeled with odd indexes and the RACH occasions of another frequency point are labeled with even indexes. In addition, the preamble transmitted from the wireless network terminal to the receiver comprises two parts SPG1 and SPG2. As shown in FIG. 17, the RACH occasions labeled with odd indexes are allocated to the part SPG1 and the RACH occasions labeled with even indexes are allocated to the part SPG2.

Figure 18:
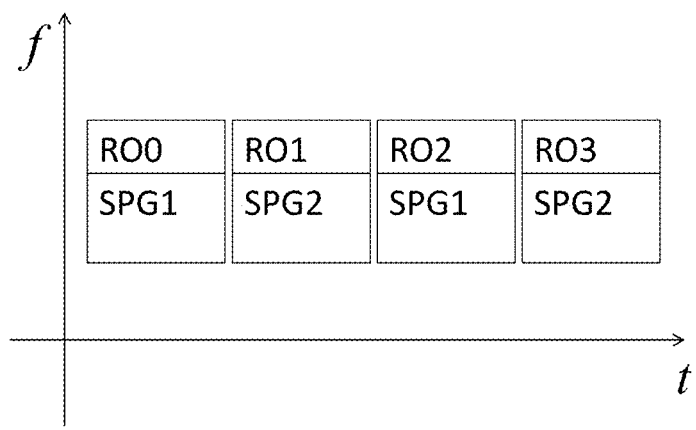
FIG. 18 shows a schematic diagram of a table of locating RACH occasions of transmitting the parts according to an embodiment of the present disclosure.

FIG. 18 shows a schematic diagram of a table of locating RACH occasions of transmitting the parts according to an embodiment of the present disclosure. In this embodiment, the number of RACH occasions in frequency domain at one time stamp is 1 and the RACH occasions are labeled with indexes starting from 0. In addition, the preamble transmitted from the wireless network terminal to the receiver comprises 2 parts SPG1 and SPG2. As shown in FIG. 18, the RACH occasions labeled with even indexes are allocated to the part SPG1 and the RACH occasions labeled with odd indexes are allocated to the part SPG2. That is, the allocation of the RACH occasions corresponding to the parts SPG1 and SPG2 are interleaved in the time domain.

In an embodiment, the table shown in FIG. 17 or 18 is predefined in the wireless network terminal. Under such a condition, the wireless network terminal may receive indications (e.g. the occasion configuration information shown in FIG. 16) of indicating at least one index entry of the table and determines the RACH occasions of transmitting the different parts in the preamble.

In an embodiment, the RO (RACH occasion) is defined as a set of time-frequency resources of transmitting the preamble. The minimum unit of the time-frequency resources in the frequency domain can be a resource block (RB), a physical RB (PRB) or an RE or sub-carrier. And the minimum unit of time-frequency resources in the time domain may be a symbol, slot, sub-frame, a frame.

Figure 19:
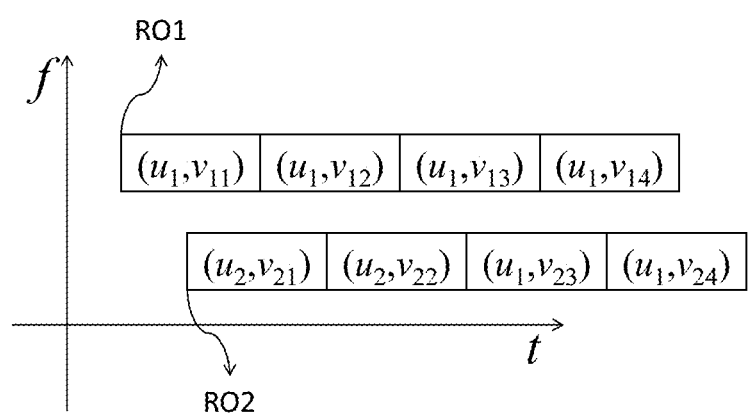
FIG. 19 shows a schematic diagram of a preamble according to an embodiment of the present disclosure.

FIG. 19 shows a schematic diagram of a preamble according to an embodiment of the present disclosure. In this embodiment, the preamble comprises sub-preambles generated based on the root $u_1$ and the cyclic shift list ($v_{11}$, $v_{12}$, $v_{13}$, $v_{14}$) and sub-preambles generated based on the root $u_2$ and the cyclic shift list ($v_{21}$, $v_{22}$, $v_{23}$, $v_{24}$) and the sub-preambles are divided into two parts, wherein the sub-preambles in each of the parts are concatenated in the time domain. Note that, the parts shown in FIG. 19 do not have the prefix. Or, the parts shown in FIG. 19 have the prefixes which are 0. Under such a condition, the cyclic shifts $v_{11}$, $v_{12}$, $v_{13}$, $v_{14}$, $v_{21}$, $v_{22}$, $v_{23}$, $v_{24}$ should be dedicatedly designed to with the time and frequency offsets. In an example, the cyclic shifts $v_{11}$, $v_{12}$, $v_{13}$, $v_{14}$, $v_{21}$, $v_{22}$, $v_{23}$, $v_{24}$ are deigned to satisfy that $v_{11}=v_{12}=v_{13}=v^{14}$ and that $v_{21}=v_{22}=v_{23}=v_{24}$ and the receiver is able to estimate the time and frequency offsets based on the preamble.

Figure 20:
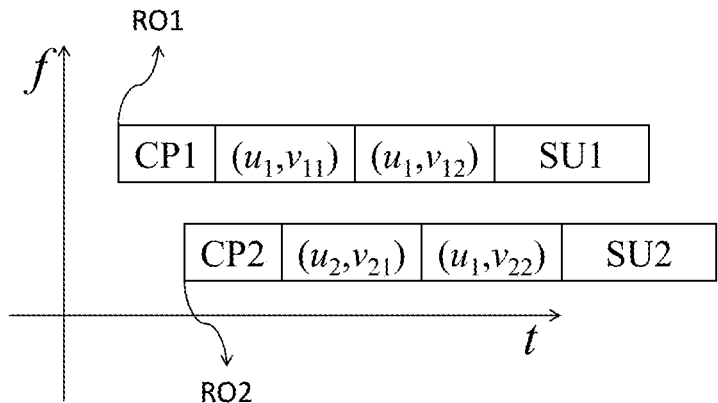
FIG. 20 shows a schematic diagram of a preamble according to an embodiment of the present disclosure.

FIG. 20 shows a schematic diagram of a preamble according to an embodiment of the present disclosure. Similar to the embodiment shown in FIG. 11, the preamble comprises sub-preambles generated based on the root $u_1$ and the cyclic shift list ($v_{11}$, $v_{12}$) and sub-preambles generated based on the root $u_2$ and the cyclic shift list ($v_{21}$, $v_{22}$). The sub-preambles are divided into two parts, wherein one of the parts has the prefix CP1 and the suffix SU1 and another of the parts has the prefix CP2 and the suffix SU2. In this embodiment, the sub-preambles corresponding to the same part are concatenated with the corresponding prefix and suffix in the time domain and the parts are distributed at different RACH occasions. In an example, there may be a blank between the suffix and the last sub-preamble of the part or the suffixes are the mixture of a blank and data (e.g. the embodiment shown FIG. 12).

Figure 21:
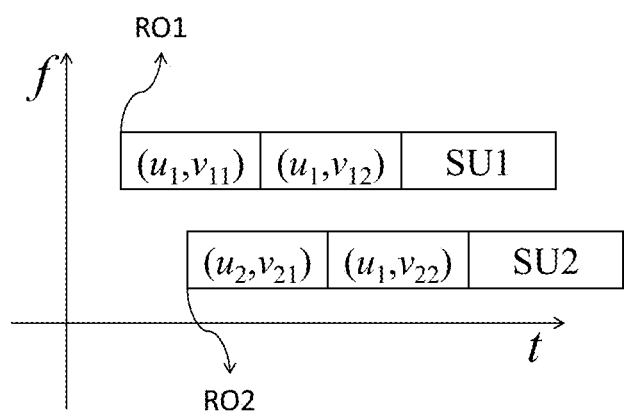
FIG. 21 shows a schematic diagram of a preamble according to an embodiment of the present disclosure.

FIG. 21 shows a schematic diagram of a preamble according to an embodiment of the present disclosure. The embodiment shown in FIG. 21 is similar to that shown in FIG. 20, thus the components with the similar functions use the same symbols. Different from the preamble shown in FIG. 20, the preamble shown in FIG. 21 does not have the prefixes CP1 and CP2 (e.g. the embodiment shown in FIG. 19 adds with the suffixes SU1 and SU2 respectively).

According to an embodiment, the preamble proposed by the present disclosure may at least comprise the following features:

(1) The proposed preamble comprises at least one parts;
(2) Each of the at least one part comprises at least one sub-preamble which are concatenated in the time domain.
(3) Each sub-preamble is generated based on a ZC sequence which has a length L and is characterized by a root u and a cyclic shift v.
(4) The sub-preambles are generated based on a plurality of roots.
(5) Each of the at least one part may have a prefix, wherein the prefix is obtained from the tail of each of the at least one part.
(6) At least one of the at least one part may have a suffix, wherein the suffix may comprise a blank and/or data (e.g. PUSCH data).
(7) The at least one part may be distributed in time domain and/or frequency domain. The time point and the frequency point of one of the at least one part may be utilized to determine the time point and the frequency point of another of the at least one part.
(8) The preamble can be expressed by:

$$(u_1, v_{11}, v_{12}, \ldots, v_{1n_1}), (u_2, v_{21}, v_{22}, \ldots, v_{2n_2}),$$
$$\ldots, (u_{N_u}, v_{N_u 1}, v_{N_u 2}, \ldots, v_{N_u n_{N_u}})$$

where the preamble is generated based on the roots $u_1$, $u_2$, ..., $u_{N_u}$ and the cyclic shift lists ($v_{11}, v_{12}, \ldots, v_{1n_1}$), ($v_{21}, v_{22}, \ldots, v_{2n_2}$), $$(v_{N_u 1}, v_{N_u 2}, \ldots v_{N_u n_{N_u}}).$$

(9) The cyclic shift lists utilized to generate the sub-preambles may be a unique signature for distinguishing the specific wireless network terminal in the random access procedure. In an example, the uniqueness of single cyclic shift list lies in the interval between adjacent cyclic shifts in the cyclic shift list. That is, two cyclic shift lists are regarded as identical when they completely overlap with each other, e.g., with a cyclic shift S over the length L.
(10) The rules recited in item (9) apply to each of the cyclic shift lists for all of the plurality of roots.
(11) The mapping between cyclic shift lists on any two different roots may be 1-to-1 mapping. In other words, when the cyclic shift list ($v_{11}, v_{12}, \ldots, v_{1n_1}$) is selected for one of the plurality of roots, all cyclic shift lists of remaining roots are determined if the mapping between cyclic shift lists on any two different roots is designed to be 1-to-1 mapping.

Note that, the number of the parts comprised in the preamble may be at least two. In other words, the preamble may include a plurality of parts.

The preamble proposed by the present disclosure is able to solve the problem resulted by the high frequency offsets and the huge time offsets. More specifically, the receiver (e.g. wireless network node) is able to estimate the frequency offset because the plurality of roots are used to generate the sub-preambles comprised in the preamble. Furthermore, since the at least one sub-preamble in the same part of the preamble are concatenated in the time domain, the endurable time offset for the wireless communications between the wireless network terminal and the receiver is effectively prolonged. In addition, if the signature of each of the cyclic shift lists is used to distinguish the wireless network terminals, the capacity of the signature pool is easily to be extended (depending on the length of each of the cyclic shift lists). Thus, preamble proposed by the present disclosure is suitable for the NTN applications.

In an embodiment, each part in the proposed preamble shown in the aforementioned embodiments may be regarded as a single preamble. In another embodiment, multiple parts in the proposed preamble shown in the aforementioned embodiments may be regarded as a single preamble. In other words, the wireless network terminal may transmit a plurality of preambles to the wireless network node for performing a random access procedure in an embodiment. According to the embodiments shown in FIGS. 3 to 21, each of the plurality of preambles comprises at least one part, each of the at least one part comprises at least one sub-preamble, and the sub-preambles in the plurality of preambles are generated based on a plurality of roots.

In an embodiment, the sub-preambles in each of the plurality of preambles are generated based on the same root (i.e. the ZC sequence used by each of the plurality of preambles is characterized by the same root).

In an embodiment, each of the at least one part may have a prefix. For example, the prefix is a cyclic prefix generated based on a tail of the corresponded part.

In an embodiment each of the at least one part may have a suffix. In an example, the suffix comprises at least one of data or a blank.

In an embodiment, the wireless network terminal may be configured, e.g. by the wireless network node, to transmit the plurality of preambles for performing the random access procedure. For example, the wireless network terminal may be configured by a radio resource control (RRC) signaling, system information block (SIB) and/or master information block (MIB).

As shown in FIGS. 13 to 21, the plurality of preambles may be transmitted at different frequency points and/or different time points. In addition, the at least one preamble may be transmitted in different RACH occasions or different REs.

Figure 22:
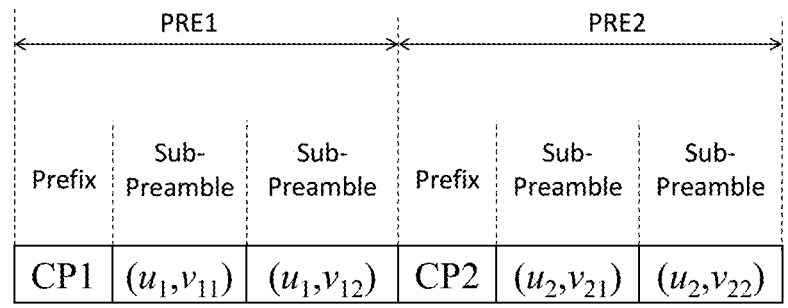
FIG. 22 shows a schematic diagram of a preamble according to an embodiment of the present disclosure.

FIG. 22 shows a schematic diagram of a preamble according to an embodiment of the present invention. In this embodiment, a wireless network terminal transmits two preambles PRE1 and PRE2 to a wireless network node for performing the random access procedure. The preamble PRE1 comprises sub-preambles generated based on the root $u_1$ and the cyclic shift list $(v_{11}, v_{12})$ and the preamble PRE2 comprises sub-preambles generated based on the root $u_2$ and the cyclic shift list $(v_{21}, v_{22})$. In FIG. 22, the preambles PRE1 and PRE2 are concatenated in the time domain. In this embodiment, each of the preambles PRE1 and PRE2 has only one part and is not labeled for brevity.

Figure 23:
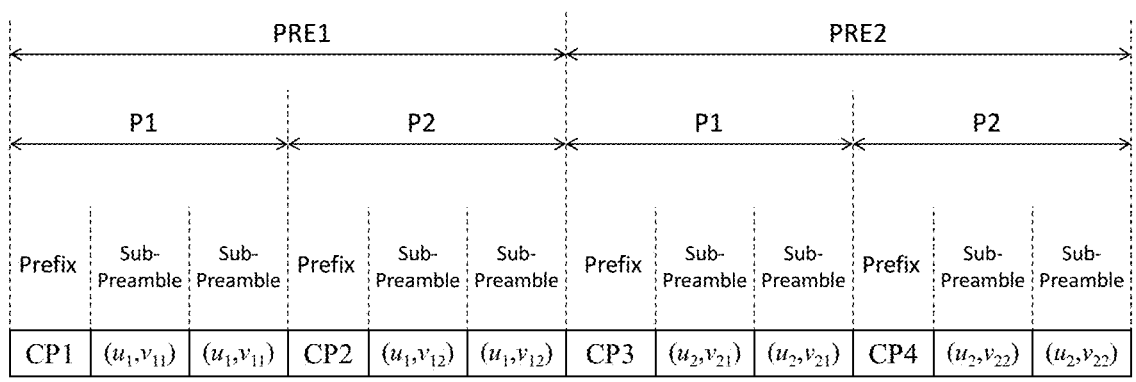
FIG. 23 shows a schematic diagram of a preamble according to an embodiment of the present disclosure.

FIG. 23 shows a schematic diagram of a preamble according to an embodiment of the present invention. In the embodiment shown in FIG. 23, the wireless network terminal transmits two preambles PRE1 and PRE2 to the wireless network node for performing (e.g. initiating) the random access procedure. The preamble PRE1 comprises two parts P1 and P2, wherein the part P1 of the preamble PRE1 comprises two sub-preambles generated based on the root $u_1$ and the cyclic shift $v_{11}$ and the part P2 of the preamble PRE1 comprises two sub-preambles generated based on the root $u_1$ and the cyclic shift $v_{12}$. Similarly, the preamble PRE2 comprises two parts P1 and P1, wherein the part P1 of the preamble PRE2 comprises two sub-preambles generated based on the root $u_2$ and the cyclic shift $v_{21}$ and the part P2 of the preamble PRE2 comprises two sub-preambles generated based on the root $u_2$ and the cyclic shift $v_{22}$. Note that, the number of the parts and/or the number of sub-preambles in each part may be different from preamble to preamble.

In an embodiment, the wireless network terminal may generate a plurality of groups, wherein each of the plurality of groups comprises at least one candidate preamble and the at least one candidate preamble in each of the plurality of groups is generated based on the plurality of roots. In an example, the at least one candidate preamble in each of the plurality of groups is generated based on the same root. That is, the sub-preambles belong to the same group are generated based on the same root (i.e. generated based on the ZC sequence characterized by the same root). Note that, the at least one candidate preamble in each of the plurality of groups may be generated based on different cyclic shifts. That is, the at least one candidate preamble in each of the plurality of groups may be generated based on the same root but different cyclic shifts.

In the embodiment of the wireless network terminal generating the plurality of groups, the wireless network terminal may select (e.g. determine) a plurality of preambles from the plurality of groups as the plurality of preambles transmitted to the wireless network node for performing the random access procedure. For example, the wireless network terminal may generate $N_L$ groups, select $N_M$ groups, select one preamble from each of the selected $N_M$ groups, and transmits the selected $N_M$ preambles to the wireless network node for performing the random access procedure, where $N_L N_M \geq 2$.

In an embodiment, the number of selected preambles (i.e. $N_M$) is configured, e.g. by the wireless network node, via an RRC signaling, a SIB and/or a MIB.

In an embodiment, the selected $N_M$ groups may be selected (e.g. determined) based on the roots corresponding to (e.g. used by) each of the $N_L$ groups. For example, there may be a plurality of candidate root sets and each candidate root set comprises a plurality of candidate roots. Note that, at least one of the plurality of candidate roots in each candidate root set is different from other candidate roots in the same candidate root set. In this example, the wireless network terminal selects one of the plurality of candidate root sets, selects the groups corresponding to the plurality of candidate roots in the selected candidate root set, and selects one candidate preamble from each of selected groups as one of the plurality of preambles transmitted to the wireless network node for performing the random access procedure.

In an embodiment, the plurality of candidate root sets is predefined in the wireless network terminal.

In an embodiment, the plurality of candidate root sets is indicated by the wireless network node, e.g., via at least one of an RRC signaling, a SIB or a MIB.

In an embodiment, the number of selected preambles (i.e. $N_M$) is determined based on the number of roots in the selected candidate root set.

In an embodiment, frequency points, time points, ROs and/or REs of transmitting the selected $N_M$ preambles are determined in ways similar to those of the embodiments shown in FIGS. 13 to 21.

In an embodiment, frequency points, time points, ROs and/or REs of transmitting the selected $N_M$ preambles are predefined. For example, the selected $N_M$ preamble may be transmitted at adjacent frequency points, time points, ROs and/or REs.

In an embodiment, the wireless network terminal may generate a plurality of candidate preambles based on the plurality of roots and select (e.g. determine) a plurality of preambles from the plurality of candidate preambles as the plurality of preambles transmitted to the wireless network node for performing the random access procedure. Note that, the number of the plurality of candidate preambles may be greater than the number of the plurality of roots and the selected plurality of preambles is generated based on different roots. For example, the wireless network terminal may generate $N_H$ preambles based on $N_K$ roots ($N_H \geq N_K \geq 2$), selects $N_M$ preamble ($N_M \geq 2$) and transmits the selected $N_M$ preambles to the wireless network node for performing the random access procedure, wherein the selected $N_M$ preambles are generated based on different roots.

In an embodiment, the number of selected preambles (i.e. $N_M$) is configured, e.g. by the wireless network node, via a RRC signaling, a SIB and/or a MIB.

In an embodiment, the number of selected preambles (i.e. $N_M$) is determined based on the number of roots in the selected candidate root set.

In an embodiment, there may be a plurality of candidate root sets and each candidate root set comprises a plurality of candidate roots. In this example, the wireless network terminal selects one of the plurality of candidate root sets, selects the $N_M$ preambles based on the plurality of candidate roots in the selected candidate root set.

In an embodiment, the plurality of candidate root sets is predefined in the wireless network terminal.

In an embodiment, the plurality of candidate root sets is indicated by the wireless network node, e.g., via at least one of an RRC signaling, a SIB or a MIB.

In an embodiment, frequency points, time points, ROs and/or REs of transmitting the selected $N_M$ preambles are determined in ways similar to those of the embodiments shown in FIGS. 13 to 21.

In an embodiment, frequency points, time points, ROs and/or REs of transmitting the selected $N_M$ preambles are predefined. For example, the selected $N_M$ preamble may be transmitted at adjacent frequency points, time points, ROs and/or REs.

In an embodiment, the configurations of transmitting the plurality of preambles is configured, e.g. by the wireless network node, via a RRC signaling, a SIB and/or a MIB.

FIG. 24 shows a flowchart of a process according to an embodiment of the present disclosure. The process shown in FIG. 24 may be performed by the wireless terminal 10 for performing a random access procedure with a wireless network node, e.g., of the NTN. The process shown in FIG. 24 may be compiled into program code and comprises the following steps:

Step 2400: Transmit a preamble comprising at least one part, wherein each of the at least one part comprises at least one sub-preamble and the sub-preambles are generated based on a plurality of roots.

Based on the process shown in FIG. 24, the wireless terminal transmits a preamble to the wireless network node for performing the random access procedure with the wireless network node. The preamble comprises at least one part and each of the at least one part comprises at least one sub-preamble. In an example, the preamble comprises a plurality of parts. Note that, the sub-preambles in the preamble are generated based on a plurality of roots (e.g. roots used for characterizing the ZC sequences of generating each of the sub-preambles). Thus, the wireless network node is able to estimate frequency offsets in the wireless communications with the wireless terminal and to accordingly detect the preamble even if there are high frequency offsets. The detailed configurations of the preamble can be referred to FIGS. 3 to 21 and corresponding descriptions and are not described herein for brevity. After the wireless network node receives and detects the preamble, the wireless network node may perform further operations for completing the random access procedure and/or performing wireless communications with the wireless network terminal.

FIG. 25 shows a flowchart of a process according to an embodiment of the present disclosure. The process shown in FIG. 25 may be performed by the wireless network node 20 for performing a random access procedure with a wireless network terminal. The wireless network node may be in the NTN. The process shown in FIG. 25 may be compiled into program code and comprises the following steps:

Step 2500: Receive a preamble comprising at least one part, wherein each of the at least one part comprises at least one sub-preamble and the sub-preambles in the plurality parts are generated based on the plurality of roots.

Based on the process shown in FIG. 25, the wireless network node receives the preamble from the wireless network terminal, wherein the preamble comprises at least one part, each of the at least one part comprises at least one sub-preamble and the sub-preambles in the preamble are generated based on a plurality of roots. In an example, the number of parts is at least two. Because the sub-preambles in the preamble are generated based on the plurality of roots, the wireless network node is able to estimate frequency offsets in the wireless communications with the wireless terminal and the wireless network node is able to estimate frequency offsets in the wireless communications with the wireless network terminal and to accordingly detect the preamble even if there are high frequency offsets. The detailed configurations of the preamble can be referred to FIGS. 3 to 21 and corresponding descriptions and are not described herein for brevity. After the receiving and detecting the preamble, the wireless network node may perform further operations for completing the random access procedure and/or performing wireless communications with the wireless network terminal.

FIG. 26 shows a flowchart of a process according to an embodiment of the present disclosure. The process shown in FIG. 26 may be performed by the wireless terminal 10 for performing a random access procedure with a wireless network node, e.g., of the NTN. The process shown in FIG. 26 may be compiled into program code and comprises the following steps:

Step 2600: Transmit a plurality of preambles, wherein each of the plurality of preambles comprises at least one part, each of the at least one part comprises at least one sub-preamble and the sub-preambles of the plurality of preambles are generated based on a plurality of roots.

Based on the process shown in FIG. 26, the wireless terminal transmits a plurality of preambles to the wireless network node for performing the random access procedure with the wireless network node. Each of the plurality of preambles comprises at least one part and each of the at least one part comprises at least one sub-preamble. In an example, the preamble comprises a plurality of parts. Note that, the sub-preambles in the plurality of preambles are generated based on a plurality of roots (e.g. roots used for characterizing the ZC sequences of generating each of the sub-preambles). Thus, the wireless network node is able to estimate frequency offsets in the wireless communications with the wireless terminal and to accordingly detect the plurality preambles even if there are high frequency offsets. The detailed configurations of the plurality of preambles can be referred to FIGS. 3 to 23 and corresponding descriptions and are not described herein for brevity. After the wireless network node receives and detects the plurality of preambles, the wireless network node may perform further operations for completing the random access procedure and/or performing wireless communications with the wireless network terminal.

FIG. 27 shows a flowchart of a process according to an embodiment of the present disclosure. The process shown in FIG. 27 may be performed by the wireless network node 20 for performing a random access procedure with a wireless network terminal. The wireless network node may be in the NTN. The process shown in FIG. 27 may be compiled into program code and comprises the following steps:

Step 2700: Receive a plurality of preambles, wherein each of the plurality of preambles comprises at least one part, each of the at least one part comprises at least one sub-preamble and the sub-preambles in the plurality preambles are generated based on the plurality of roots.

Based on the process shown in FIG. 27, the wireless network node receives a plurality of preambles from the wireless network terminal, wherein each of the plurality of preambles comprises at least one part, each of the at least one part comprises at least one sub-preamble and the sub-preambles in the plurality of preambles are generated based on a plurality of roots. In an example, the number of parts in a preamble may be more than one. Because the sub-preambles in the plurality of preambles are generated based on the plurality of roots, the wireless network node is able to estimate frequency offsets in the wireless communications with the wireless terminal and the wireless network node is able to estimate frequency offsets in the wireless communications with the wireless network terminal and to accordingly detect the plurality of preambles even if there are high frequency offsets. The detailed configurations of the preamble can be referred to FIGS. 3 to 23 and corresponding descriptions and are not described herein for brevity. After the receiving and detecting the preamble, the wireless network node may perform further operations for completing the random access procedure and/or performing wireless communications with the wireless network terminal.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

We claim:

1. A wireless communication method for use in a wireless terminal, comprising:
    transmitting, to a wireless network node, a preamble comprising a plurality of parts,
    wherein each of the plurality of parts comprises at least one sub-preamble and the sub-preambles in the plurality of parts are generated based on a plurality of roots,
    wherein the sub-preambles in the plurality of parts are generated based on different cyclic shift lists,
    wherein the at least one sub-preamble in each of the plurality of parts is concatenated in the time domain, and
    wherein the plurality of parts is transmitted at a plurality of random access channel (RACH) occasions, and the wireless communication method further comprises:
    receiving, from the wireless network node, occasion configuration information of indicating the plurality of RACH occasions,
    wherein the occasion configuration information indicates:
        at least one index offset among the plurality of RACH occasions,
        at least one time offset among the plurality of RACH occasions,
        at least one frequency offset among the plurality of RACH occasions, or
        at least one index entry of a table, wherein the plurality of RACH occasions is pre-defined as the table, and
    wherein the plurality of RACH occasions is divided into a plurality of occasion groups corresponding to the plurality of parts.

2. The wireless communication method of claim 1, wherein the at least one sub-preamble in each of the plurality of parts is generated based on different roots.

3. The wireless communication method of claim 1, wherein each of the plurality of parts does not have a suffix.

4. The wireless communication method of claim 1, wherein the plurality of parts is concatenated in the time domain.

5. The wireless communication method of claim 1, wherein the plurality of parts is transmitted in different frequency points.

6. The wireless communication method of claim 1, further comprising:
    receiving, from the wireless network node, preamble configuration information used for generating the sub-preambles in the plurality of parts of the preamble;
    wherein the preamble configuration information indicates at least one of a length of a Zadoff-Chu sequence, the plurality of roots or a plurality of cyclic shift lists.

7. A wireless communication method for use in a wireless network node, comprising:
    receiving, from a wireless terminal, a preamble comprising a plurality of parts,
    wherein each of the plurality of parts comprises at least one sub-preamble and the sub-preambles in the plurality of parts are generated based on a plurality of roots,
    wherein the sub-preambles in the plurality of parts are generated based on different cyclic shift lists,
    wherein the at least one sub-preamble in each of the plurality of parts is concatenated in the time domain, and
    wherein the plurality of parts is received at a plurality of random access channel (RACH) occasions, and the wireless communication method further comprises:
    transmitting, to the wireless terminal, occasion configuration information of indicating the plurality of RACH occasions,
    wherein the occasion configuration information indicates:
        at least one index offset among the plurality of RACH occasions,
        at least one time offset among the plurality of RACH occasions,
        at least one frequency offset among the plurality of RACH occasions, or
        at least one index entry of a table, wherein the plurality of RACH occasions is pre-defined as the table, and
    wherein the plurality of RACH occasions is divided into a plurality of occasion groups corresponding to the plurality of parts.

8. The wireless communication method of claim 7, wherein the at least one sub-preamble in each of the plurality of parts is generated based on different roots.

9. The wireless communication method of claim 7, wherein each of the plurality of parts does not have a suffix.

10. The wireless communication method of claim 7, wherein the plurality of parts is concatenated in the time domain.

11. The wireless communication method of claim 7, wherein the plurality of parts is received in different frequency points.

12. The wireless communication method of claim 7, further comprising:
transmitting, to the wireless terminal, preamble configuration information used for generating the sub-preambles in the plurality of parts of the preamble;
wherein the preamble configuration information indicates at least one of a length of a Zadoff-Chu sequence, the plurality of roots or a plurality of cyclic shift lists.

13. A wireless terminal comprising:
a communication unit transmitting, to a wireless network node, a preamble comprising a plurality of parts,
wherein each of the plurality of parts comprises at least one sub-preamble and the sub-preambles in the plurality of parts are generated based on a plurality of roots,
wherein the sub-preambles in the plurality of parts are generated based on different cyclic shift lists,
wherein the at least one sub-preamble in each of the plurality of parts is concatenated in the time domain, and
wherein the plurality of parts is transmitted at a plurality of random access channel (RACH) occasions, and the communication unit receives, from the wireless network node, occasion configuration information of indicating the plurality of RACH occasions,
wherein the occasion configuration information indicates:
at least one index offset among the plurality of RACH occasions,
at least one time offset among the plurality of RACH occasions,
at least one frequency offset among the plurality of RACH occasions, or
at least one index entry of a table, wherein the plurality of RACH occasions is pre-defined as the table, and
wherein the plurality of RACH occasions is divided into a plurality of occasion groups corresponding to the plurality of parts.

* * * * *